May 8, 1956     A. W. HARKNESS     2,744,260

VALVE BALL CAGE

Filed Feb. 11, 1954

Andrew W. Harkness
INVENTOR.

United States Patent Office 2,744,260
Patented May 8, 1956

2,744,260

VALVE BALL CAGE

Andrew W. Harkness, South Glens Falls, N. Y.

Application February 11, 1954, Serial No. 409,735

1 Claim. (Cl. 4—57)

This invention relates to a valve ball cage and more specifically provides a device for attachment to the conventional valve outlet located in the bottom of the usual flush tank.

An object of this invention is to provide an improved valve ball cage for attachment to the conventional valve outlet having the usual resilient gasket wherein the cage has sharpened end portions for penetrating engagement with the resilient gasket thereby firmly mounting the ball cage over the valve outlet for guiding the movement of the valve ball.

A further object of this invention is to provide a valve ball cage which is simple in construction, easy to assemble on conventional flush tanks, well adapted for its purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1:
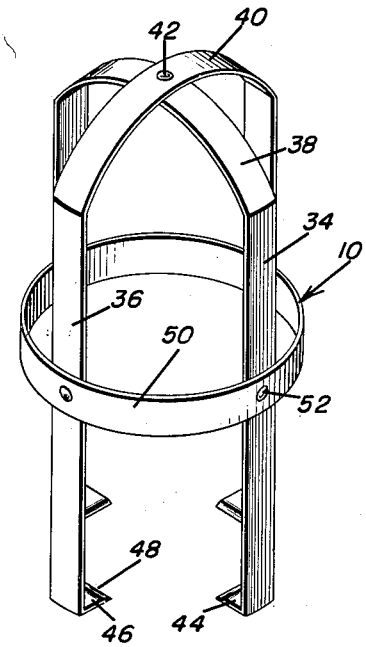
Figure 1 is a perspective view showing the valve ball cage of the present invention.
Figure 2:
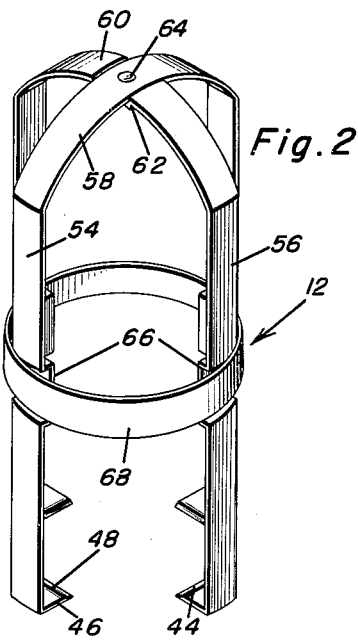
Figure 2 is a perspective view showing the modified form of the valve ball cage of the present invention.
Figure 3:
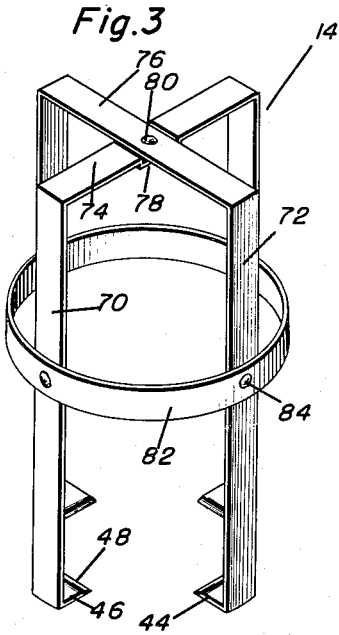
Figure 3 is a perspective view showing yet another modified form of the valve ball cage of the present invention.

Referring now specifically to the drawings, it will be seen that the valve ball cage of the present invention is generally indicated by the numeral 10 in Figure 1, the numeral 12 in Figure 2, and the numeral 14 in Figure 3. Each of the modified forms of the valve ball cages of the present invention is adapted to be secured to the usual valve outlet 16 positioned in the bottom of a flush tank 18 and the valve outlet 16 includes the usual overflow pipe 20, the valve ball seat 22, the discharge pipe 24, a gasket 26 and a clamp nut 28 which retains the valve outlet 16 in the bottom of the flush tank 18 in a conventional manner.

A valve ball 30 is positioned on the valve seat 22 for selective engagement therewith and a suitable flexible chain 32 is provided for lifting the valve ball 30 from the valve ball seat 22 thereby permitting the water to be discharged through the opening 24 into the toilet bowl in the conventional manner.

As specifically shown in Figure 1, the valve cage 10 includes a pair of U-shaped members 34 and 36 having crossed bight portions 38 and 40 secured together by a suitable rivet 42. The free ends of the leg portions of the U-shaped members generally indicated by the numerals 44 and 46 are sharpened as indicated by the numeral 48 for purpose described hereinafter.

Centrally of the leg portions of the U-shaped members 34 and 36 is a circular member 50 secured to each of the leg members by suitable rivets 52 or other suitable fastening means.

Figure 4:
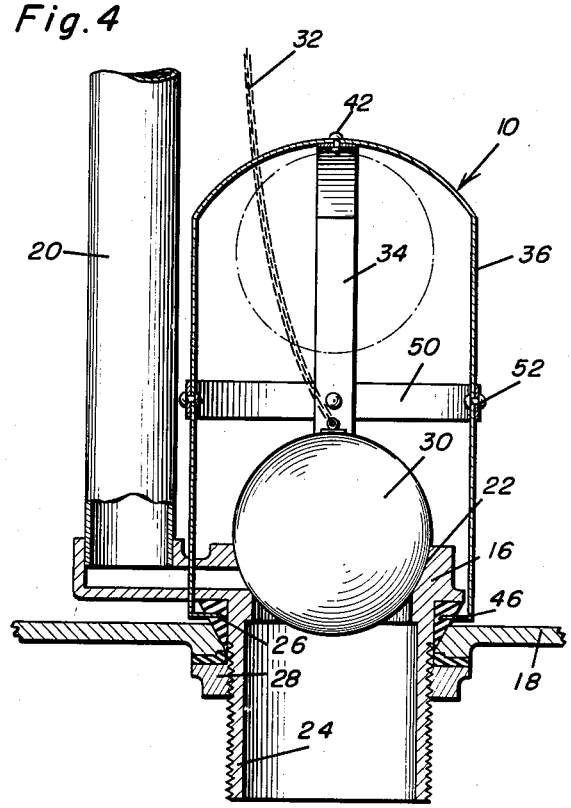
Figure 4 is a vertical section showing the valve ball cage of Figure 1 mounted on the conventional valve and valve outlet found in the usual flush tanks.

As illustrated in Figure 4, the inturned end portions 44 and 46 are positioned in the resilient gasket and the inherent resiliency of the leg portions of the U-shaped members 34 and 36 together with the surrounding ring 50 urges the pointed ends 48 of the inturned ends 44 and 46 into penetrating engagement with the resilient washer or gasket 26 thereby mounting the valve ball cage on the valve outlet 16.

As specifically illustrated in Figure 2, a pair of U-shaped members 54 and 56 are provided with intersecting bight portions 58 and 60 with the bight portions 60 having a recessed area indicated by the numeral 62 for receiving the bight portion 58 in intersecting relation and the recessed area 62 rigidly associates the bight portions 58 and 60 and a suitable rivet 64 is utilized for holding the bight portions 58 and 60 in correct relation.

Adjacent the central portion of the leg members of the U-shaped members 54 and 56 is a recessed area 66 in each leg for receiving a circular member 68 which has a diameter substantially the same as the diameter of the bottom of the recessed area 66. The inturned end portions 46 and 44 and the sharpened ends 48 thereof are the same as in the modification of Figure 1 and the device is assembled on the gasket 26 by positioning the cage 12 in position and then pushing the circular ring 68 down over the U-shaped members 54 and 56 into the recessed portions 66 thereby resiliently urging the inturned end portions 44 and 46 towards each other and the sharpened ends 48 into the gasket 26 thereby securely positioning the valve ball cage 12 in position over the valve outlet 16.

As specifically illustrated in Figure 3, the valve ball cage 14 includes a pair of U-shaped members 70 and 72 having crossed bight portions 74 and 76 with the bight portions 74 having a recessed area 78 and the bight portion 76 received therein and a suitable rivet 80 for retaining the U-shaped member 70 and 72 in assembled relation. A circular member 82 is secured to the leg portion of the U-shaped members 70 and 72 by suitable rivets 84 and the inturned end portions 46 and 44 are sharpened as indicated by the numeral 48 substantially the same as in the modification shown in Figure 1 and Figure 2.

The operation of the device will be readily understood. The valve ball cages 10, 12, and 14 are assembled on the valve outlet 16 in substantially the same manner wherein the circular rings 50, 68, and 82 retain the inturned end portions 46 and 44 with the sharpened edges 48 in penetrating engagement with the gasket 26 for sealing the valve outlet 16.

The valve ball cages guide the movement of the valve ball 30 when it is lifted from the valve ball seat 22 by the flexible chain 32 wherein the valve ball 30 will be returned to the correct position on the valve ball seat 22 when all of the water has been discharged through the opening 24. The valve ball cages of the present invention may be constructed of a suitable material such as brass or the like which is non-corrosive in accordance with the usual fittings found within all conventional flush tanks.

The material of which the valve ball cages are constructed must be resilient enough to urge the sharpened ends of the inturned end portions 44 and 46 into penetrating engagement with the resilient or rubber gasket usually employed in the flush tanks. It will be seen that the valve ball 30 may be easily and quickly replaced by removing the valve ball cages 10, 12, and 14 by loosening the inturned members 44 and 46 into disengagement with the gasket 26 thereby permitting the valve ball cages to be removed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In combination with a flush tank outlet having a peripheral flange and a valve seat extending through and secured to the bottom of a flush tank, a sealing gasket between the bottom of the tank and the peripheral flange, a valve ball positioned on said valve seat, a flexible lift member connected to said valve ball, and a cage forming an enclosure for guiding movement of the valve ball, said cage including a pair of inverted U-shaped strap members having perpendicularly disposed bight portions and parallel leg portions, a recess formed in the bight portion of one of said strap members for positioning the bight portion of the other strap member in perpendicular relation, fastening means securing the bight portions together, a slidable ring encircling said leg portions for urging the leg portions towards each other, the free end of each leg portion being inturned and provided with a sharpened edge penetrating into the sealing gasket for securing the cage in enclosing relation to the valve ball when the ring is moved towards the free ends of the leg portions, the central portion of each of said leg portions having an inwardly extending recess for positioning and receiving said ring for retaining the leg portions in substantially parallel relation and permitting outward spreading of the legs for removing the cage when the ring is moved to the upper end thereof.

References Cited in the file of this patent

UNITED STATES PATENTS

| | | |
|---|---|---|
| 2,372,848 | Owens | Apr. 3, 1945 |
| 2,572,982 | Brown | Oct. 30, 1951 |
| 2,650,369 | Alliss | Sept. 1, 1953 |
| 2,678,451 | Allen | May 18, 1954 |